(12) United States Patent
Kim et al.

(10) Patent No.: US 9,175,193 B2
(45) Date of Patent: Nov. 3, 2015

(54) ADHESIVE SHEET, MANUFACTURING METHOD THEREOF, OPTICAL FILTER AND PLASMA DISPLAY PANEL

(75) Inventors: Woo Ha Kim, Daejeon (KR); Hyo Jin Jeong, Cheonan-si (KR); In Cheon Han, Seoul (KR); Se Ra Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 537 days.

(21) Appl. No.: 12/989,635

(22) PCT Filed: Apr. 27, 2009

(86) PCT No.: PCT/KR2009/002194
§ 371 (c)(1),
(2), (4) Date: Jan. 10, 2011

(87) PCT Pub. No.: WO2009/134043
PCT Pub. Date: Nov. 5, 2009

(65) Prior Publication Data
US 2011/0102885 A1     May 5, 2011

(30) Foreign Application Priority Data
Apr. 30, 2008   (KR) .................. 10-2008-0040811

(51) Int. Cl.
| | |
|---|---|
| B32B 7/12 | (2006.01) |
| C09J 7/02 | (2006.01) |
| C09J 133/02 | (2006.01) |
| C08K 5/00 | (2006.01) |
| C08K 5/5419 | (2006.01) |

(52) U.S. Cl.
CPC .............. *C09J 7/0246* (2013.01); *C09J 133/02* (2013.01); *C08K 5/0025* (2013.01); *C08K 5/5419* (2013.01); *C08L 2312/00* (2013.01); *C09J 2203/318* (2013.01); *C09J 2433/00* (2013.01); *C09J 2467/006* (2013.01); *Y10T 428/2848* (2015.01)

(58) Field of Classification Search
None
See application file for complete search history.

(56) References Cited

U.S. PATENT DOCUMENTS

| | | | | |
|---|---|---|---|---|
| 5,985,954 | A * | 11/1999 | Tsuchida et al. | 523/400 |
| 6,579,941 | B1 * | 6/2003 | Sasaki et al. | 525/100 |
| 2003/0008140 | A1 * | 1/2003 | Takizawa et al. | 428/355 EP |
| 2003/0054166 | A1 * | 3/2003 | Chang et al. | 428/355 AC |
| 2003/0175512 | A1 * | 9/2003 | Ishiguro et al. | 428/355 AC |
| 2005/0003130 | A1 * | 1/2005 | Tanaka et al. | 428/40.1 |
| 2005/0181148 | A1 * | 8/2005 | Kim et al. | 428/1.55 |
| 2006/0159936 | A1 * | 7/2006 | Chang et al. | 428/447 |
| 2011/0122343 | A1 * | 5/2011 | Park et al. | 349/96 |

FOREIGN PATENT DOCUMENTS

| | | | |
|---|---|---|---|
| CN | 1912038 | 2/2007 | |
| JP | 09-080230 | 3/1997 | |
| JP | 2001-247832 | 9/2001 | |
| JP | 2005-263963 | 9/2005 | |
| JP | 2006-143915 | 6/2006 | |
| JP | 2006-290993 | 10/2006 | |
| JP | 2008-503639 | 2/2008 | |
| JP | 2008-063350 | 3/2008 | |
| KR | 10-2000-0067624 | 11/2000 | |
| KR | 1020000067624 A * | 11/2000 | ............ C09J 133/04 |
| KR | 10-2001-0101097 A | 11/2001 | |
| KR | 10-2007-0015077 A | 2/2007 | |
| KR | 10-2007-0034001 A | 3/2007 | |
| KR | 10-2008-0015511 A | 2/2008 | |
| TW | 200626976 | 8/2006 | |
| TW | 200720388 | 6/2007 | |
| TW | 200728424 | 8/2007 | |

OTHER PUBLICATIONS

Donatas Satas (editor), Handbook of Pressure Sensitive Adhesive Technology, 1997, Satas & Associates, 3rd edition, pp. 444-447, 458-465,486-487.*
Shimomura Kazuhiro, "Pressure-Sensitive Adhesive Composition and Pressure-Sensitive Adhesive Tape", Machine translation of JP 2001-247832, Sep. 14, 2001.*
Gunter, Oertel (ed), "Polyurethane Handbook", 1994, Carl Hanser Verlag, 2nd Ed, Chapter 2.*
Istvan Benedek and Luc J. Heymans, "Pressure Sensitive Adhesive Technology", 1997, Marcel Dekker Inc., pp. 276-277.*
Donatas Satas (ed), "Handbook of Pressure Sensitive Adhesive Technology", 1999, Satas & Associates, pp. 464-465.*
Moroishi, Yutaka et al., Machine translation of JP 2008-063350A, Mar. 21, 2008.*
In Cheon Han et al., English translation of KR 20000067624A, Nov. 25, 2000.*
Kazuhiro, Shimomura, English translation of JP 2001-247832A, Sep. 14, 2001.*

* cited by examiner

*Primary Examiner* — Anish Desai
(74) *Attorney, Agent, or Firm* — Dentons US LLP

(57) ABSTRACT

The present invention relates to an adhesive sheet, a manufacturing method thereof, an optical filter and a plasma display panel. The present invention provides an adhesive sheet having an excellent base adhesion property through a hydroxyl group applied to a base film and an isocyanate-based compound contained in an adhesive layer through a corona processing. Accordingly, the present invention provides an adhesive sheet having an excellent base adhesion property and improved high temperature stability by using a carboxyl group-containing acryl-based copolymer having a high glass transition temperature. Further, the adhesive sheet of the present invention contains a siloxane-based compound if needed, thus preventing an initial peeling force from being increased. Accordingly, the present invention provides an adhesive sheet with an excellent base adhesion property, high temperature stability, adhesive property and reworkability to glass, and provides a manufacturing method thereof, an optical filter containing the same and a plasma display panel.

14 Claims, No Drawings

ADHESIVE SHEET, MANUFACTURING METHOD THEREOF, OPTICAL FILTER AND PLASMA DISPLAY PANEL

This application is a National Stage Entry of International Application No. PCT/KR2009/002194, filed Apr. 27, 2009, and claims the benefit of Korean Application No. 10-2008-0040811, filed on Apr. 30, 2008, which is hereby incorporated by reference for all purposes as if fully set forth herein.

TECHNICAL FIELD

The present invention relates to a pressure-sensitive adhesive sheet that is capable of showing excellent stability in high temperatures, close adhesion to an adherend, superior reworkability, and excellent adhesion to glass; also disclosed is a method of preparing the pressure-sensitive adhesive sheet, an optical filter, and a plasma display panel (PDP), each of which includes the pressure-sensitive adhesive sheet.

BACKGROUND ART

Recently, the demand for high-definition and large-screen display devices such as digital televisions is increasing and thus improvements are being actively made in various fields such as cathode ray tubes (CRT), liquid crystal displays (LCD), and plasma display panels (PDP).

The CRT, which has been widely used in televisions, has a disadvantage that there is an increase in length and weight with an increase of screen size, although it has superior resolution and display quality. For this reason, the CRT is not suitable for large screens of 40 inches or more. The PDP can be implemented as a large screen, and a PDP of 100 inches has already been developed, whereby the PDP, together with the LCD, is at the head of the large-screen display field. However, the PDP has a problem in that the PDP filter is separated from glass due to high temperatures in the containers during shipping. Such separation occurs when a pressure-sensitive adhesive has a very low glass transition temperature (Tg) or its adhesive strength with respect to glass is reduced. To prevent the separation, it is necessary to secure stability at high temperature by increasing the Tg of the pressure-sensitive adhesive, and to increase the adhesive strength with respect to glass. In order to add high Tg and high adhesive strength to an acrylic pressure-sensitive adhesive that is mainly used in the PDP filter, a polar monomer including a carboxyl group should be used. However, the carboxyl group, although it increases the Tg of the pressure-sensitive adhesive, lowers close-adherence with respect to an adherend such as a base film, and builds up initial peeling strength, causing paste marks during reworking. Moreover, such a pressure-sensitive adhesive layer has very high adhesive strength with respect to a glass interface, whereby reworkability is significantly degraded due to high build-up of the peeling strength during high-speed peeling.

To solve the foregoing problems, Japanese Patent Publication No. 2005-263963 discloses a pressures-sensitive adhesive composition including an acrylic copolymer containing an isocyanate group. However, the disclosed technique has to use an isocyanate group-containing acrylic copolymer and an acrylic copolymer containing no isocyanate group as two separate components, resulting in a cumbersome process of mixing those two components before use. Furthermore, in this technique, the contained isocyanate group may react with glass, resulting in excessive increase of adhesive strength with respect to the glass interface.

Japanese Patent Publication No. 2006-143915 discloses a technique for forming a primer layer with resin having a reactive functional group on a polyester base film to improve adherence strength between the polyester base film and an acrylic pressure-sensitive adhesive. This technique, however, requires a very complex treatment process and greatly increases the manufacturing cost. Japanese Patent Publication No. 2006-290993 discloses a method for increasing close adherence to a base film by including methacrylate in a hydroxy group-containing acrylic copolymer. However, this technique fails to exhibit a greater Tg increase than the technique using a carboxyl group-containing monomer. In the above technique, to raise the amount of increase in Tg, an excessive amount of methacrylate monomer has to be added during polymerization. In this case, the molecular weight of the resin cannot be increased much, resulting in degradation of endurance reliability.

DISCLOSURE

Technical Problem

The present invention has been made after consideration of the foregoing problems in the prior art, and an object of the present invention is to provide a pressure-sensitive adhesive sheet capable of showing excellent stability in high temperatures, close adhesion to an adherend such as a base film, superior reworkability, and excellent adhesion to glass; also provided is a method of preparing the pressure-sensitive adhesive sheet, an optical filter, and a plasma display panel (PDP), each of which includes the pressure-sensitive adhesive sheet.

Technical Solution

The present invention provides, as a means for solving the foregoing problems, a pressure-sensitive adhesive sheet including: a base film, having a corona-treated layer on one side or both sides thereof, and a pressure-sensitive adhesive layer which is formed on the corona-treated layer of the base film. The pressure-sensitive adhesive layer includes an acrylic copolymer and a multifunctional isocyanate compound.

The present invention also provides, as another means for solving the foregoing problems, a method of preparing a pressure-sensitive adhesive sheet. The method includes a first step of introducing a hydroxy group by performing corona discharge treatment on one side or both sides of a base film, and a second step of forming a pressure-sensitive adhesive layer onto the corona discharge-treated base film.

The present invention further provides, as another means for solving the foregoing problems, an optical filter including the above-described pressure-sensitive adhesive sheet and a functional film formed on one side or both sides of the pressure-sensitive adhesive sheet.

The present invention further provides, as another means for solving the foregoing problems, a plasma display panel (PDP) in which the above-described optical filter is attached to the front surface of the panel.

Advantageous Effects

The present invention provides a pressure-sensitive adhesive sheet showing excellent close-adherence with a base film, by means of a hydroxy group introduced into the base film through corona treatment and an isocyanate compound included in a pressure-sensitive adhesive layer. Accordingly, the present invention can provide a pressure-sensitive adhesive sheet capable of showing excellent close adhesion with a base film, while improving its stability in high temperatures by using a carboxyl group-containing acrylic copolymer that has a high glass transition temperature. In addition, the pressure-sensitive adhesive sheet according to the present invention may include a siloxane compound, thereby preventing the build-up of initial peeling strength. Therefore, the present invention can provide a pressure-sensitive adhesive sheet capable of showing excellent close-adherence with a base film, stability in high temperatures, and superior reworkability and adhesion with respect to glass; it also provides a method of preparing the pressure-sensitive adhesive sheet, an optical filter, and a PDP, each of which includes the pressure-sensitive adhesive sheet.

BEST MODE

The present invention relates to a pressure-sensitive adhesive sheet including:
a base film having a corona-treated layer on one side or both sides thereof; and
a pressure-sensitive adhesive layer which is formed on the corona-treated layer of the base film,
the pressure-sensitive adhesive layer including an acrylic copolymer and a multifunctional isocyanate compound.

In the present invention, excellent close-adhesion property with respect to the base film can be accomplished by reaction between a hydroxy group being present in the corona-treated layer of the base film and the isocyanate compound included in the pressure-sensitive adhesive layer.

Hereinafter, the pressure-sensitive adhesive sheet according to the present invention will be described in detail.

The type of base film included in the pressure-sensitive adhesive sheet according to the present invention is not specifically limited, and can be any material generally used in this field. Examples of such a material may include plastic films and glasses. For a pressure-sensitive adhesive sheet used in a plasma display panel (PDP) filter, a polyester film such as a polyethyleneterephthalate (PET) film is most widely used.

In the present invention, the corona-treated layer is formed on one side or both sides of the base film. The term "corona-treated layer" as used herein refers to a layer on the base film, to which corona treatment is applied, resulting in a hydroxy group being introduced thereto through the corona treatment. Corona treatment is a method for modifying a target in order to increase the wettability of the surface of the target by introducing a specific functional group (e.g. a hydroxy group) through radiation of corona discharge onto the target. In the present invention, the corona-treated layer including the hydroxy group may be formed on one side or both sides of the base film in order to cause a reaction between the hydroxy group and the isocyanate compound included in the pressure-sensitive adhesive layer. In the present invention, a method for forming the corona-treated layer on the base film is not specifically limited and a method generally used in this field can be adopted.

In the present invention, the pressure-sensitive adhesive layer formed on the corona-treated layer includes an acrylic copolymer and a multifunctional isocyanate compound.

In one embodiment, the acrylic copolymer may be an acrylic copolymer having a carboxyl group (carboxyl group-containing acrylic copolymer). As such, since the copolymer includes the carboxyl group, the pressure-sensitive adhesive layer can have a high glass transition temperature (Tg) and thus exhibit excellent stability in high temperatures. The carboxyl group may be introduced by using a carboxyl group-containing monomer during polymerization of the copolymer.

It is preferable that the acrylic copolymer used in the present invention have a weight average molecular weight of 500,000 to 3,000,000. If the weight average molecular weight is less than 500,000, the elastic modulus of the pressure-sensitive adhesive may be reduced, resulting in deterioration of high-temperature endurance. If the weight average molecular weight is in excess of 3,000,000, degradation of the coating property or inter-layer peeling may occur during long-term use.

In one embodiment, the acrylic copolymer is preferably a copolymer of a monomer mixture including 85 to 99.9 parts by weight of a (meth)acrylic acid ester monomer having a hydrocarbon group (e.g., an alkyl group) having 1 to 12 carbon atoms; and 0.1 to 15 parts by weight of a carboxyl group-containing monomer. Detailed examples of the (meth)acrylic acid ester monomer may be one or more selected from a group consisting of methyl(meth)acrylate, ethyl(meth)acrylate, n-propyl(meth)acrylate, isopropyl(meth)acrylate, butyl(meth)acrylate, t-butyl(meth)acrylate, pentyl(meth)acrylate, 2-ethylhexyl(meth)acrylate, n-octyl(meth)acrylate, isooctyl(meth)acrylate, isononyl(meth)acrylate, 2-ethylbutyl(meth)acrylate, and benzyl(meth)acrylate, without being limited thereto. The monomer is preferably included in the acrylic copolymer in an amount of 85 to 99.9 parts by weight, relative to the carboxyl group-containing monomer. If the content is less than 85 parts by weight, the initial adhesive strength of the pressure-sensitive adhesive layer may be degraded. If the content is in excess of 99.9 parts by weight, the endurance problem may occur due to reduction of cohesive strength.

As mentioned above, the carboxyl group-containing monomer included in the acrylic copolymer according to the present invention may impart stability at high temperatures to the pressure-sensitive adhesive and give a crosslinking structure to the pressure-sensitive adhesive by reacting with an epoxy or aziridine hardener as described below. The type of monomer is not specifically limited, and for example, may use one or more selected from a group consisting of (anhydrous) (meth)acrylic acid, an acrylic acid dimer, an itaconic acid, maleic acid, maleic anhydride, fumaric acid, and carboxyl alkyl(meth)acrylate (e.g., carboxyl ethyl(meth)acrylate or carboxyl propyl(meth)acrylate). The carboxyl group-containing monomer is preferably included in the acrylic copolymer in an amount of 0.1 to 15 parts by weight, relative to the content of the (meth)acrylic ester monomer. If the content is less than 0.1 parts by weight, an increase of Tg may not be obtained. If the content is in excess of 15 parts by weight, the peeling strength may significantly increase, resulting in degradation of reworkability.

The acrylic copolymer according to the present invention may include, in addition to the aforementioned monomer, a hydroxy group-containing monomer, capable of reacting with a multifunctional isocyanate compound, in an amount of 5 parts by weight or less, relative to the monomer as described above. The type of the hydroxy group-containing monomer is not specifically limited, and examples thereof include one or more selected from a group consisting of 2-hydroxyethyl(meth)acrylate, 2-hydroxypropyl(meth)acrylate, 4-hydroxybutyl(meth)acrylate, 2-hydroxyethyleneglycol(meth)acrylate, and 2-hydroxypropyleneglycol(meth)acrylate. The monomer is preferably included in the acrylic copolymer in an amount of 5 parts by weight or less, and more preferably in an amount of 2 parts by weight or less. If the content exceeds 5 parts by weight, gelation may occur in the resin and the content of the isocyanate compound capable of reacting with the hydroxy group (the corona-treated layer) of the base film may be relatively reduced.

The acrylic copolymer including the foregoing components can be prepared by any method generally used in this field, and examples of the general method may include solution polymerization, photo-polymerization, bulk polymerization, suspension polymerization, and emulsion polymerization.

The multifunctional isocyanate compound included together with the acrylic copolymer in the pressure-sensitive adhesive layer function to improve close-adhesion property with respect to the base film by reacting with the hydroxy group introduced onto the base film. Detailed examples of the multifunctional isocyanate compound may be one or more selected from a group consisting of tolylene diisocyanate, xylene diisocyanate, diphenylmethane diisocyanate, hexamethylene diisocyanate, isophorone diisocyanate, tetramethylxylene diisocyanate, naphthalene diisocyanate, and a reactant of at least one of the foregoing isocyanate compounds with polyol (e.g., trimethyloypropane), without being limited thereto. The isocyanate compound is preferably included in an amount of 0.01 to 10 parts by weight, relative to 100 parts by weight of the acrylic copolymer. If the content is less than 0.01 parts by weight, the effect of improving close-adhesion property with the base film may be degraded. If the content is in excess of 10 parts by weight, the pot life of the resin may be reduced, resulting in deterioration of the coating property.

The pressure-sensitive adhesive layer according to the present invention may further include 0.01 to 15 parts by weight of a hardener. The hardener may give a crosslinking structure to the pressure-sensitive adhesive layer by reacting with the carboxyl group of the copolymer. The hardener may be any one generally used in this field, and examples thereof may include an epoxy hardener and an aziridine hardener. More specifically, the examples may be one or more selected from a group consisting of ethyleneglycol diglycidylether, triglycidylether, trimethylolpropane triglycidylether, N,N,N', N'-tetraglycidyl ethylenediamine, glycerin diglycidylether, N,N'-toluene-2,4-bis(1-aziridinecarboxyamide), triethylenemelamine, bisisophthaloyl-1-(2-methylaziridine), and tri-1-aziridinylphosphineoxide, without being limited thereto. The hardener is preferably included in the pressure-sensitive adhesive layer in an amount of 0.01 to 15 parts by weight, relative to 100 parts by weight of the copolymer. If the content is less than 0.01 parts by weight, durability may be degraded due to the insufficient crosslinking structure. If the content is in excess of 15 parts by weight, the pressure-sensitive adhesive may not sufficiently relax stress caused by the thermal expansion or shrinkage of the base due to excessively high crosslinking density, or may cause adhesion failure due to tacky degradation at room temperature.

The pressure-sensitive adhesive according to the present invention may further include a siloxane compound in an amount of 0.01 parts by weight or less, relative to 100 parts by weight of the copolymer. If a carboxyl group-containing copolymer is used to implement high Tg during formation of the pressure-sensitive adhesive layer, there are possibilities that the initial peeling strength of the pressure-sensitive adhesive layer may excessively increase, causing paste marks during reworking. However, in the present invention, by properly adding the siloxane compound (surfactant), the build-up of the initial peeling strength can be solved and superior reworkability can be added to the pressure-sensitive adhesive sheet. Although the siloxane compound is not specifically limited, polyalkyleneoxide-modified polydimethylsiloxane may preferably be used, and a compound expressed by Formula 1 may be specifically used for the siloxane compound in the present invention.

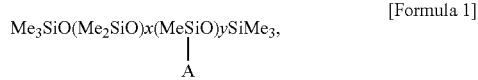

$$Me_3SiO(Me_2SiO)x(MeSiO)ySiMe_3,$$
$$|$$
$$A$$

[Formula 1]

wherein x indicates an integer greater than 0, y indicates an integer greater than 1, and A indicates —CH$_2$CH$_2$CH$_2$O (EO)$_m$(PO)$_n$Z, where EO indicates ethyleneoxide, PO indicates propyleneoxide, and Z indicates hydrogen, amine, or alkyl, and (m+n) is greater than 1 (n≠0).

Detailed examples of the siloxane compound may include L series products (e.g., Silwet L-7200, Silwet L-7210, Silwet L-7220, Silwet L-7230, Silwet L-7280, Silwet L-7550, Silwet L-7607, Silwet L-7608, Silwet L-8610, etc.) sold by Silwet.

The siloxane compound may be included in an amount of 0.01 parts by weight or less relative to 100 parts by weight of the acrylic copolymer. If the content is in excess of 0.01 parts by weight, the initial peeling strength may be excessively reduced thereby causing adhesion failure, or the peeling strength with respect to a releasing film is increased thereby causing peeling failure with respect to the releasing film during adhesion. In the present invention, if the siloxane compound is included, a lower limit of the content of the siloxane compound is not specifically limited and may be properly adjusted according to a desired usage. In the present invention, the content of the siloxane compound may be properly adjusted in a range, for example, of more than 0.001 parts by weight relative to 100 parts by weight of the acrylic copolymer.

The pressure-sensitive adhesive layer according to the present invention may further include 0.01 to 10 parts by weight of a silane coupling agent to improve adherence endurance. The silane coupling agent increases the pressure-sensitive adhesive strength over time or through heat, thereby preventing bubble formation and peeling in a high temperature and/or high humidity state and improving endurance reliability. The type of coupling agent that can be used in the present invention is not specifically limited, and may include a general coupling agent such as one or more selected from a group consisting of β-(3,4-epoxycyclohexyl)ethyltrimethoxy silane, γ-glycidoxy propyltrimethoxy silane, γ-glycidoxy propylmethyldiethoxy silane, and γ-glycidoxy propyltriethoxy silane. If the content of the coupling agent is less than 0.01 parts by weight, the pressure-sensitive adhesive strength improving effect may be insufficient. If the content is in excess of 10 parts by weight, bubble formation or peeling may occur due to the use of the excessive amount of coupling agent, thereby degrading endurance reliability.

The pressure-sensitive adhesive layer according to the present invention may further include 1 to 100 parts by weight of a tackifier resin to adjust pressure-sensitive adhesive performance Examples of the tackifier resin may be one or more selected from a group consisting of (hydrogenated) hydrocarbon resin, (hydrogenated) rosin resin, (hydrogenated) rosin ester resin, (hydrogenated) terpene resin, (hydrogenated) terpene penol resin, polymerized rosin resin, and polymerized rosin ester resin. If the content of the tackifier resin is less than 1 part by weight, the effect of addition may be insufficient. If the content is in excess of 100 parts by weight, the compatibility or cohesive strength improving effect may be degraded.

The pressure-sensitive adhesive layer according to the present invention may further include one or more suitable additives selected from a group consisting of near-infrared absorbers, epoxy resin, curing agents, plasticizers, UV stabilizers, antioxidants, coloring agents, reinforcing agents, and fillers.

The pressure-sensitive adhesive layer according to the present invention, which includes the foregoing components, has a crosslinking density of preferably 1% to 95%. If the crosslinking density is less than 1%, endurance may be degraded in high temperatures. If the crosslinking density is in excess of 95%, the stress relaxing effect may be degraded or inter-layer peeling may occur.

The present invention also provides a method of preparing a pressure-sensitive adhesive sheet, including:

a first step of introducing a hydroxy group by performing corona discharge treatment on one side or both sides of a base film; and a second step of forming a pressure-sensitive adhesive layer onto the corona discharge-treated base film.

In the first step of the present invention, a hydroxy group which can react with an isocyanate compound of a pressure-sensitive adhesive layer is introduced into a base film by performing corona-discharge treatment on one side or both sides of the base film. The corona-discharge treatment is a method for increasing the wettability of a target through electrical discharge having high frequencies. Such corona-discharge treatment may be performed by radiating a corona, generated by applying a high-frequency high voltage between two electrodes, to a base film, thereby introducing a functional group (hydroxy group) onto the surface of the base film. The method for performing the corona-discharge treatment is not specifically limited in the present invention, and can be any method generally used in this field without restriction.

In the second step of the present invention, the pressure-sensitive adhesive layer is formed on the base film to which the hydroxy group is introduced by the corona treatment. The method for forming the pressure-sensitive adhesive layer is not specially limited. In other words, in the present invention, a pressure-sensitive adhesive composition including the foregoing components is prepared by using a method generally used in this field, after which the pressure-sensitive adhesive composition is applied onto the base film to form the pressure-sensitive adhesive layer. To improve the coating property, the composition may be applied after being diluted with a proper organic solvent. If the pressure-sensitive adhesive composition includes a siloxane compound, the composition may be prepared by diluting the compound 10 times to 50 times, mixing the diluted compound with an acrylic copolymer and then mixing the mixture with other components (e.g., a hardener), without being limited thereto.

In the method of preparing the pressure-sensitive adhesive layer, the method for curing the pressure-sensitive adhesive composition is not specifically limited. In the present invention, for example, a general thermal curing method known in this field or a photo-curing method using ultraviolet (UV) rays or electron beams (EB) may be used.

The present invention also relates to an optical film including:

the pressure-sensitive adhesive sheet described above; and a functional film formed on one side or both sides of the pressure-sensitive adhesive sheet. The optical filter is a functional filter which is attached to the front surface (viewer side) of a display device such as a PDP in order to shield electromagnetic waves and near-infrared rays and prevent diffused reflection.

The optical filter is formed by laminating a glass or plastic film and various functional films. Examples of the functional films may include a near-infrared (NIR) cut film for preventing near-infrared rays which may cause malfunction of a remote control, a color compensation film for allowing better color expression of a display device, an electromagnetic interference (EMI) shielding film for shielding harmful electromagnetic waves emitted from a module, and an anti-reflection (AR) film for preventing glare caused by an external light source. In the present invention, one kind or two or more kinds of functional films may be used according to the use for which the optical filter is applied.

The present invention also relates to a PDP in which the optical filter according to the present invention is attached onto the front surface of the panel. The front surface of the panel means a viewer side or the surface of the viewer side of the PDP.

The PDP is a display device using a gas discharge phenomenon (plasma phenomenon), which includes a PDP module and an optical filter. In the PDP of the present invention, the optical filter according to the present invention may be attached onto the front surface of the panel or the front surface of a layer laminated on the front surface of the panel. In the present invention, the pressure-sensitive adhesive sheet according to the present invention may be used as a pressure-sensitive adhesive sheet for attaching the optical filter onto the front surface of a panel.

MODE FOR INVENTION

Hereinafter, the present invention will be described in more detail with reference to examples according to the present invention and comparative examples which are not in accordance with the present invention, however the scope of the present invention is not limited by the following examples.

Preparation Example 1

Preparation of Acrylic Copolymer

To a 1000 cc reactor that was equipped with a cooling system for easy regulation of temperature and nitrogen gas is refluxed therein, a monomer mixture composed of 95 parts by weight of n-butyl acrylate (BA) and 5 parts by weight of acrylic acid was added, and then 100 parts by weight of ethyl acetate was added as a solvent. To remove oxygen therefrom, nitrogen gas was purged for 20 minutes, after which the temperature was kept at 60° C. This mixture became uniform and then 0.03 parts by weight of azobis isobutyronitrile (AIBN) diluted to 50% with ethyl acetate was added as a reaction initiator, after which the mixture was reacted for 8 hours, thereby preparing an acrylic copolymer A1 having a molecular weight of 1,500 K which was measured by using a polystyrene standard sample.

Example 1

A pressure-sensitive adhesive composition was prepared according to the composition shown in Table 1. Taking into account the coating property, the composition was diluted to a proper concentration and evenly mixed, after which the mixture was coated onto a releasing film having a thickness of 38 μm, and then dried, thereby preparing an even pressure-sensitive adhesive layer having a thickness of 25 μm. The prepared pressure-sensitive adhesive layer was laminated onto a PET interface of a corona-treated PDP EMI shielding film and then laminated with an NIR film, after which the resultant was treated in an autoclave at 40° C. and 4 atm for 30 minutes, thereby obtaining a PDP filter. The corona treatment method applied to the base film is described below.

TABLE 1

| | |
|---|---|
| Acrylic Copolymer | A1 (100 parts by weight) |
| Isocyanate Compound | Tolylene diisocyanate adduct of trimethylolpropane (0.5 parts by weight) |
| Hardener | N,N,N',N'-tetraglycidyl ethylene diamine (0.03 parts by weight) |
| Siloxane Compound | Polyalkyleneoxide-modified polydimethylsiloxane compound (EO:PO = 0.89:1) (0.005 parts by weight) |

Corona Treatment

Corona treatment was performed on the PET base of the PDP filter at a roll rotation speed of 10 cycles/min 5 times, and the voltage at discharge was about 300V.

Example 2

Except for the fact that a composition according to the composition shown in Table 2 was used, a PDP filter was prepared in the same manner as in Example 1.

TABLE 2

| | |
|---|---|
| Acrylic Copolymer | A1 (100 parts by weight) |
| Isocyanate Compound | Tolylene diisocyanate adduct of trimethylolpropane (0.5 parts by weight) |
| Hardener | N,N,N',N'-tetraglycidyl ethylene diamine (0.03 parts by weight) |
| Siloxane Compound | Not used |

Example 3

Except for the fact that a composition according to the composition shown in Table 3 was used, a PDP filter was prepared in the same manner as in Example 1.

TABLE 3

| | |
|---|---|
| Acrylic Copolymer | A1 (100 parts by weight) |
| Isocyanate Compound | Tolylene diisocyanate adduct of trimethylolpropane (0.5 parts by weight) |
| Hardener | N,N,N',N'-tetraglycidyl ethylene diamine (0.03 parts by weight) |
| Siloxane Compound | Polyalkyleneoxide-modified polydimethylsiloxane compound (EO:PO = 2.65:1) (0.0015s part by weight) |

Comparative Example 1

Except for the fact that a composition according to the composition shown in Table 4 was used and corona-discharge treatment was not performed on a PET film, a PDP filter was prepared in the same manner as in Example 1.

TABLE 4

| | |
|---|---|
| Acrylic Copolymer | A1 (100 parts by weight) |
| Isocyanate Compound | Tolylene diisocyanate adduct of trimethylolpropane (0.5 parts by weight) |
| Hardener | N,N,N',N'-tetraglycidyl ethylene diamine (0.03 parts by weight) |
| Siloxane Compound | Polyalkyleneoxide-modified polydimethylsiloxane (EO:PO = 0.89:1) (0.005 parts by weight) |

Comparative Example 2

Except for the fact that a composition according to the composition shown in Table 5 was used, a PDP filter was prepared in the same manner as in Example 1.

TABLE 5

| | |
|---|---|
| Acrylic Copolymer | A1 (100 parts by weight) |
| Isocyanate Compound | Tolylene diisocyanate adduct of trimethylolpropane (0.5 parts by weight) |
| Hardener | N,N,N',N'-tetraglycidyl ethylene diamine (0.03 parts by weight) |
| Silane Coupling Agent | 3-methacryloxypropyltriethoxysilane (0.03 parts by weight) |

Comparative Example 3

Except for the fact that a composition according to the composition shown in Table 6 was used, a PDP filter was prepared in the same manner as in Example 1.

TABLE 6

| | |
|---|---|
| Acrylic Copolymer | A1 (100 parts by weight) |
| Isocyanate Compound | Tolylene diisocyanate adduct of trimethylolpropane (0.5 parts by weight) |
| Hardener | N,N,N',N'-tetraglycidyl ethylene diamine (0.03 parts by weight) |
| Siloxane Compound | Polyalkyleneoxide-modified polydimethylsiloxane (EO:PO = 2.65:1) (0.015 parts by weight) |

Comparative Example 4

Except for the fact that a composition according to the composition shown in Table 7 was used, a PDP filter was prepared in the same manner as in Example 1.

TABLE 4

| | |
|---|---|
| Acrylic Copolymer | A1 (100 parts by weight) |
| Hardener | N,N,N',N'-tetraglycidyl ethylene diamine (0.03 parts by weight) |
| Siloxane Compound | Polyalkyleneoxide-modified polydimethylsiloxane (EO:PO = 0.89:1) (0.005 parts by weight) |

With respect to the prepared PDP optical filters according to the Examples and Comparative Examples, base close-adherence and adhesive strength to glass were measured according to the following method, and the results of the measurements are shown in Table 8.

1. Close-Adhesion Property with Respect to a Base Film

A manufactured pressure-sensitive adhesive was applied onto a PET interface which is a base film of a PDP filter, and then whether or not the pressure-sensitive adhesive remained when it was removed by rubbing with a finger was evaluated according to the following criteria:

○: there is no lifting or peeling of the pressure-sensitive adhesive between the pressure-sensitive adhesive and the base.

x: there is lifting or peeling of the pressure-sensitive adhesive between the pressure-sensitive adhesive and the base 2. Adhesive Strength with Respect to Glass A manufactured pressure-sensitive adhesive was applied onto a PET interface which is a base film of a PDP filter, and then the resultant was cut into a size of 2.5 cm×12 cm to prepare a specimen. The specimen was laminated onto well polished glass and then kept at a temperature of 70° C. for 1 hour, after which it was cooled at room temperature for 30 minutes and then adhesive strength with respect to glass was measured. As a measurement device, a texture analyzer (SMS (Stable Micro System) (manufacturer)) was used, and a 180° peel test method was applied with a peeling speed of 0.3 M/min (low-speed peeling strength) and 2.4 M/min (high-speed peeling strength).

TABLE 8

| | 180° Peeling Strength | | |
|---|---|---|---|
| | Low-speed peeling strength | High-speed peeling strength | Base Close-Adherence |
| Example 1 | 9.0N | 14N | ○ |
| Example 2 | 13N | 20N | ○ |
| Example 3 | 9.5N | 17.5N | ○ |
| Comparative Example 1 | 9.5N | 13.5N | x |
| Comparative Example 2 | 12N | 23N | x |
| Comparative Example 3 | 9.5N | 16N | x |
| Comparative Example 4 | 9.5N | 15N | x |

As can be seen from the results shown in Table 8, when the pressure-sensitive adhesive layer including the isocyanate compound was formed on the PET interface to which the hydroxy group was introduced through corona treatment, it showed superior close-adhesion with a base film. On the other hand, in Comparative Examples 1 to 3 where the isocyanate compound was used but corona treatment was not performed, and Comparative Example 4 in which the isocyanate compound was not used but corona treatment was performed, it showed very poor close-adhesion with respect to the base film. When a siloxane compound such as polyalkyleneoxide-modified polydimethylsiloxane was further included, it can be seen that the increase of the high-speed peeling strength of the pressure-sensitive adhesive layer was sufficiently prevented.

The invention claimed is:

1. A pressure-sensitive adhesive sheet comprising:
a base film having a corona-treated layer, into which hydroxyl groups are introduced, on one or both sides thereof; and
a pressure-sensitive adhesive layer which is formed on the corona-treated layer of the base film, and which includes a cured product of a pressure-sensitive adhesive composition comprising a carboxyl group-containing acrylic copolymer; a multifunctional isocyanate compound capable of reacting with the hydroxyl groups of the corona-treated layer; a hardener selected from the group consisting of an epoxy hardener and an aziridine hardener; and 0.001 to 0.01 parts by weight of a siloxane compound relative to 100 parts by weight of the carboxyl group-containing acrylic copolymer,
wherein the carboxyl group-containing acrylic copolymer comprises 85 to 99.9 parts by weight of a (meth)acrylic acid ester monomer including a hydrocarbon group having 1 to 12 carbon atoms and 0.1 to 15 parts by weight of a carboxyl group-containing monomer, relative to 100 parts by weight of the acrylic copolymer,
wherein the hardener is comprised in the pressure-sensitive adhesive composition in an amount of 0.01 to 0.03 parts by weight relative to 100 parts by weight of the acrylic copolymer, and
wherein the multifunctional isocyanate compound of the pressure-sensitive adhesive layer reacts with the hydroxyl groups of the corona-treated layer, and the hardener forms a crosslinking structure by reacting with the carboxyl group of the acrylic copolymer.

2. The pressure-sensitive adhesive sheet of claim 1, wherein the base film is a polyester film.

3. The pressure-sensitive adhesive sheet of claim 1, wherein the (meth)acrylic acid ester monomer is one or more selected from a group consisting of methyl(meth)acrylate, ethyl(meth)acrylate, n-propyl(meth)acrylate, isopropyl (meth)acrylate, butyl(meth)acrylate, t-butyl(meth)acrylate, pentyl(meth)acrylate, 2-ethylhexyl(meth)acrylate, n-octyl (meth)acrylate, isooctyl(meth)acrylate, isononyl(meth)acrylate, 2-ethylbutyl(meth)acrylate, and benzyl(meth)acrylate.

4. The pressure-sensitive adhesive sheet of claim 1, wherein the carboxyl group-containing monomer is one or more selected from a group consisting of (meth)acrylic acid, an acrylic acid dimer, an itaconic acid, maleic acid, maleic anhydride, fumaric acid, and carboxyl alkyl(meth)acrylate.

5. The pressure-sensitive adhesive sheet of claim 1, wherein the acrylic copolymer further comprises 5 parts by weight or less of a hydroxy group-containing monomer.

6. The pressure-sensitive adhesive sheet of claim 1, wherein the multifunctional isocyanate compound is one or more selected from a group consisting of tolylene diisocyanate, xylene diisocyanate, diphenylmethane diisocyanate, hexamethylene diisocyanate, isophorone diisocyanate, tetramethylxylene diisocyanate, naphthalene diisocyanate, and a reaction product of the isocyanate compound with polyol.

7. The pressure-sensitive adhesive sheet of claim 1, wherein the multifunctional isocyanate compound is included in an amount of 0.01 to 10 parts by weight relative to 100 parts by weight of the acrylic copolymer.

8. The pressure-sensitive adhesive sheet of claim 1, wherein the siloxane compound is represented by:

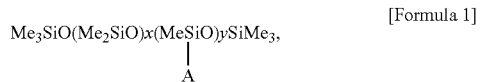

[Formula 1]
$Me_3SiO(Me_2SiO)x(MeSiO)ySiMe_3$,
          |
          A where x indicates an integer greater than 0, y indicates an integer greater than 1, and A indicates $-CH_2CH_2CH_2O(EO)_m(PO)_nZ$, where EO indicates ethyleneoxide, PO indicates propyleneoxide, and Z indicates hydrogen, amine, or alkyl, and (m+n) is greater than 1 (n≠0).

9. The pressure-sensitive adhesive sheet of claim 1, wherein the pressure-sensitive adhesive layer further comprises 0.01 to 10 parts by weight of a silane coupling agent relative to 100 parts by weight of the acrylic copolymer.

10. The pressure-sensitive adhesive sheet of claim 1, wherein the pressure-sensitive adhesive layer further comprises 1 to 100 parts by weight of tackifier resin relative to 100 parts by weight of the acrylic copolymer.

11. An optical filter comprising:
the pressure-sensitive adhesive sheet according to claim 1; and
a functional film formed on one side or both sides of the pressure-sensitive adhesive sheet.

12. The optical filter of claim 11, wherein the functional film is one or more selected from a group consisting of a near-infrared cut film, a color compensation film, an electromagnetic interference shielding film, and an anti-reflection film.

13. A plasma display panel, in which the optical filter according to claim 11 is attached to the front surface of the panel.

14. A method of preparing the pressure-sensitive adhesive sheet of claim 1, comprising:
- a first step of introducing a hydroxy group by performing corona discharge treatment on one side or both sides of a base film; and
- a second step of forming a pressure-sensitive adhesive layer including the cured product of the pressure-sensitive adhesive composition comprising the carboxyl group-containing acrylic copolymer, the multifunctional isocyanate compound, the hardener selected from the group consisting of the epoxy hardener and the aziridine hardener; and the siloxane compound onto the corona discharge-treated base film,
- wherein the carboxyl group-containing acrylic copolymer comprises 85 to 99.9 parts by weight of a (meth)acrylic acid ester monomer including a hydrocarbon group having 1 to 12 carbon atoms and 0.1 to 15 parts by weight of a carboxyl group-containing monomer, relative to 100 parts by weight of the acrylic copolymer, and
- wherein the hardener is comprised in the pressure-sensitive adhesive composition in an amount of 0.01 to 0.03 parts by weight relative to 100 parts by weight of the acrylic copolymer.

* * * * *